United States Patent
Stothers (10) Patent No.: US 8,727,607 B2
(45) Date of Patent: May 20, 2014

(54) METHOD OF CALIBRATING A HEATER SYSTEM

(75) Inventor: Ian McGregor Stothers, Saham Toney (GB)

(73) Assignee: Ultra Electronics Limited, Greenford (GB)

( * ) Notice: Subject to any disclaimer, the term of this patent is extended or adjusted under 35 U.S.C. 154(b) by 323 days.

(21) Appl. No.: 13/093,544

(22) Filed: Apr. 25, 2011

(65) Prior Publication Data
US 2012/0269227 A1    Oct. 25, 2012

(51) Int. Cl.
*G01K 17/00*    (2006.01)

(52) U.S. Cl.
USPC .......... 374/1; 374/5; 374/33; 374/45; 374/57; 374/141; 374/164; 374/16

(58) Field of Classification Search
USPC ......... 374/1, 3, 4, 5, 7, 11, 16, 28, 29, 30, 32, 374/33, 39, 100, 109, 110, 112, 114, 164, 374/166, 152, 208, 45, 57; 324/500; 244/134 R, 134 B, 134 C, 134 F; 701/45; 73/118.03; 364/571.01; 219/618, 627
See application file for complete search history.

(56) References Cited

U.S. PATENT DOCUMENTS

| | | | |
|---|---|---|---|
| 4,324,285 A * | 4/1982 | Henderson | 165/11.1 |
| 4,901,257 A * | 2/1990 | Chang et al. | 702/99 |
| 5,005,005 A * | 4/1991 | Brossia et al. | 340/604 |
| 5,112,136 A * | 5/1992 | Sakuma et al. | 374/44 |
| 5,552,998 A | 9/1996 | Datta | |
| 5,653,538 A * | 8/1997 | Phillips | 374/138 |
| 6,839,651 B2 * | 1/2005 | Lantz et al. | 702/130 |
| 7,523,889 B2 * | 4/2009 | Bourjac et al. | 244/134 D |
| 8,348,501 B2 * | 1/2013 | Severson | 374/16 |
| 2006/0224349 A1 * | 10/2006 | Butterfield | 702/130 |
| 2007/0176049 A1 | 8/2007 | Greene | |
| 2010/0116042 A1 * | 5/2010 | Johnson et al. | 73/118.03 |

FOREIGN PATENT DOCUMENTS

GB    2 449 651 A    12/2008
WO    WO 2007/107732 A1    9/2007

* cited by examiner

*Primary Examiner* — Gail Verbitsky
(74) *Attorney, Agent, or Firm* — Dickstein Shapiro LLP (57) ABSTRACT

A method of calibrating a heater system for heating a surface of a structure, the heater system including a heater element, a temperature sensor proximate the heater element for outputting a signal indicative of the temperature of the heater element, and a controller for controlling the supply of power to the heater element in dependence on the signal to maintain the temperature of the heater element at a first substantially constant temperature. The method comprises: immersing the structure in a fluid for maintaining the surface of the structure at a second substantially constant temperature; supplying an amount of power to the heater element; receiving the signal from the temperature sensor and determining a temperature at the temperature sensor; and determining a setpoint temperature for controlling the heater element in dependence on the signal and the second substantially constant temperature.

7 Claims, 6 Drawing Sheets

NOMINAL POWER OF ANTI-ICING HEATER ZONES

Fig. 5

POWER RATIO OF ANTI-ICING HEATER ZONES

METHOD OF CALIBRATING A HEATER SYSTEM

BACKGROUND OF THE INVENTION

The present invention relates to a method of calibrating a heater system.

Ice protection systems are one example of a heater system for protecting against the build-up of ice on a structure. One common application of ice protection systems is on aircraft. During flight, the surfaces of an aircraft can be exposed to water vapour at low temperatures and, if no preventative action is taken, ice can quickly form on the wings, on control surfaces, and on other parts of the aircraft in such a way as to alter the aerodynamic performance of the aircraft (for example by altering the airflow around the aircraft and by adding additional weight to it) with potentially catastrophic consequences.

Electrothermal ice protection systems comprise a large number of heater devices (such as heater mats), which can be used as anti-icing zones in which a sufficient temperature is maintained at the surface of the wing in order to prevent the formation of ice on and behind the protected zone. These heater devices can also be used as de-icing zones to shed ice that has been allowed to accrete on the protected region. The de-icing mats are cyclically energised in order to melt the interface between the wing and the accreted ice, causing the ice to be shed.

In such an ice protection system it is important to avoid overheating of the heater devices (heating mats) in order to avoid a failure either of the devices or in the structure to which the devices are attached (this is known as an 'overtemperature' condition). Many modern aircraft (and other structures) use composite materials, which can suffer damage (delamination of the material, for example) at a relatively low temperature. Temperature 'overshoot' of the heater devices must therefore be controlled whilst maintaining rapid heating of the protected surface(s). At the same time, the temperature of the heater mat and external surfaces must not fall below the critical temperature at which ice shedding starts to occur (known as an 'undertemperature' condition).

Aircraft are normally subject to a range of different icing conditions during flight, such as different air temperatures, air velocities, relative humidity, and so on, which can depend for example on the location, altitude, orientation, air speed or pitch of the aircraft, the prevailing meteorological conditions, and so on. Different icing conditions can determine not only the temperatures and velocities (and so on) at which ice will form on different parts of the aircraft structure, but also the heat loss from the aircraft structure.

One approach to avoiding the temperature overshoot problem is disclosed in International Patent Application No. WO 2007/107732, the content of which is incorporated herein by reference. This document describes an ice protection system which uses a controller to maintain the temperature of a heater element (a heater mat) at a constant temperature regardless of the icing conditions such that, under a worst-case icing scenario, the power dissipated by the heater mat is sufficient to maintain the surface of the aircraft above a minimum temperature for de-icing. A temperature probe is embedded behind the heater element and records a temperature that is essentially identical to the temperature of the heater element (because the temperature gradient behind the heater element is much shallower than the temperature gradient between the heater element and the exposed surface). The controller operates by attempting to maintain the temperature at the temperature probe at a constant demand (or 'setpoint') temperature, which in turn maintains a substantially constant heater mat temperature.

One problem encountered with this system is that heater mats have some variability in thickness due to manufacturing tolerances. There can also be variation in the thickness of the dielectric layers surrounding the heater mat (and the like). This variability in thickness and a number of other factors can cause local 'hot' and 'cold' spots in the heater mat. If the temperature sensor is located behind a 'hot' spot or 'cold' spot, the temperature control can overall be a significant number of degrees centigrade too cold or too hot, respectively. This can lead to the undertemperature and overtemperature conditions mentioned above. If other heater mats are 'slaved' to the same controller, then the manufacturing tolerances 'stack up', and the permissible variation in temperature from the ideal can be relatively small.

SUMMARY OF THE INVENTION

In consideration of these issues, a first aspect of the invention provides a method of calibrating a heater system for heating a surface of a structure, the heater system including a heater element (which may be a heater mat or other electrothermal or other heating device), a temperature sensor (such as a resistive sensor or another type, for example including embedded control circuitry) proximate the heater element for outputting a signal (which may be a voltage or other electrical signal, or one or more packets of data) indicative of the temperature of the heater element, and a controller (such as dedicated hardware or a suitably programmed conventional microcontroller) for controlling the supply of power to the heater element in dependence on the signal to maintain the temperature of the heater element at a first substantially constant temperature, the method comprising: immersing the structure in a fluid (which may be substantially liquid or vapour, for example) for maintaining the surface of the structure at a second substantially constant temperature; supplying an amount of power (which may be a constant amount over time, or at least long enough to create a steady state temperature gradient) to the heater element; receiving the signal from the temperature sensor and determining a temperature at the temperature sensor; and determining a setpoint temperature for controlling the heater element in dependence on the signal and the second substantially constant temperature. The signal output by the temperature sensor may be substantially equal to the temperature of the heater element (or at least in respect of a local region of the heater element) or may otherwise have a clearly defined relationship with the temperature of the heater element (for example if there is a known temperature gradient between the sensor and element).

This method can thus allow a setpoint temperature to be computed without direct measurement of an average heater mat temperature, or the direct recreation of operating conditions. This can improve the accuracy of control of the heater system, which can reduce the risk of overtemperature or undertemperature conditions, for example.

If the controller controls the supply of power to the heater element in order to maintain the surface of the structure at a minimum temperature (in one embodiment, in the region of 20° C.), determining a setpoint temperature may include determining the setpoint temperature additionally in dependence on the minimum temperature, for example by determining a temperature difference between the temperature at the temperature sensor and the second substantially constant temperature, and determining the setpoint temperature in dependence on the minimum temperature and the temperature difference. This method may further comprise adding the minimum temperature to the temperature difference to obtain the setpoint temperature.

The temperature sensor may be installed such that, in use, the temperature of the temperature sensor is substantially equal to the temperature of the heater element proximate the temperature sensor. In particular, the temperature sensor may be installed on the opposite side of the heater element to the surface (where the temperature gradient is much shallower).

The heater system may be operable to maintain the temperature of the surface within a defined temperature range. The range may extend such that at all times the temperature of the surface exceeds a predefined minimum surface temperature. The heater system may be operable under a range of conditions resulting in a range of heat flows from the surface into the environment (the heat flows may for example be total heat flows, or heat flows per unit area, or similar). The power level (applied to the heater element) may correspond to a heat flow out of the heater element that may be expected during the normal operation of the system. This power level may be computed, for example, by multiplying the expected power loss per area of the structure (for example in units of $W/m^2$ or similar) by the total area of the structure. The heat flow may be a substantially constant heat flux. This may occur after operating the test rig for a short while, for example, when transient effects have died down.

In one embodiment, the heat flow out of the heater element may be substantially equal to or may exceed the largest heat flow out of the surface during use (that is, during a 'worst case scenario'). This can help to determine a setpoint that will result in the surface temperature exceeding a minimum temperature even during the worst case scenario conditions, for example. The range of conditions may be dependent on a variation of at least one environmental factor, said at least one environmental factor may include at least one of temperature, relative humidity, density, pressure, the thermal conductivity of a surrounding fluid, the thermal capacity of a surrounding fluid, and the relative velocity of a surrounding fluid, for example. Other factors are of course possible.

The controller may be operable to maintain the heater element at a substantially constant temperature irrespective of the current condition. Alternatively, the temperature of the heater element may be varied to take into account the prevailing conditions.

The method may be used with an ice protection system, such as an aircraft ice protection system. In this case, the structure may be a portion of a wing or an engine structure, or the like.

The controller may have a defined setpoint temperature different to the determined setpoint temperature. In this case the method may further comprise adjusting the defined setpoint temperature of the controller, or it may (for example) further comprise adjusting the electrical properties of at least one of the heater element and the temperature sensor in order to cause the determined setpoint temperature to become substantially equal to the defined setpoint temperature. This may be done by inserting a resistor in series with at least one of the heater element and the temperature sensor.

The method may further comprise installing at least one further heater element, and configuring the controller additionally to control the supply of power to said at least one further heater element. The method may include determining the ratio between a desired heat flow from the first heater element and a desired heat flow from said at least one further heater element, and supplying a corresponding proportion of power to said at least one further heater element relative to the power supplied to the first heater element.

The structure may be immersed in a thermal reservoir, such as an ice bath. The ice bath may be stirred to ensure uniformity of temperature and effective transfer of heat away from the structure's surface.

The amount of power (supplied to the heater element) may be determined by multiplying a desired heat flux by the surface area of the structure.

In another aspect, the invention provides a system for calibrating a heater system for heating a surface of a structure, the system comprising: the structure; the heater system, including: a heater element; a temperature sensor proximate the heater element for outputting a signal indicative of the temperature of the heater element; and a controller for controlling the supply of power to the heater element in dependence on the signal to maintain the temperature of the heater element at a first substantially constant temperature; means for immersing the structure in a fluid for maintaining the surface of the structure at a second substantially constant temperature; means for supplying an amount of power to the heater element; and means for receiving the signal from the temperature sensor and determining a temperature at the temperature sensor, whereby to allow the determination of a setpoint temperature for controlling the heater element in dependence on the signal and the second substantially constant temperature.

Additional system features may be provided in line with the method features as aforesaid.

The present invention can be implemented in any convenient form, for example using dedicated hardware, or a mixture of dedicated hardware and software. The invention may further comprise a data network (for example to enable communications between the control system and other parts of the structure), which can include any local area network or other appropriate network. Aspects of the present invention encompass computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid-state memory device.

Although each aspect and various features of the present invention have been defined hereinabove independently, it will be appreciated that, where appropriate, each aspect can be used in any combination with any other aspect(s) or features of the invention. In particular, features disclosed in relation to apparatus aspects may be provided in appropriate form in relation to method aspects, and vice versa.

BRIEF DESCRIPTION OF THE DRAWINGS

Embodiments of the present invention will now be described with reference to the accompanying drawings, in which.

DETAILED DESCRIPTION OF THE PREFERRED EMBODIMENTS

Figure 1:
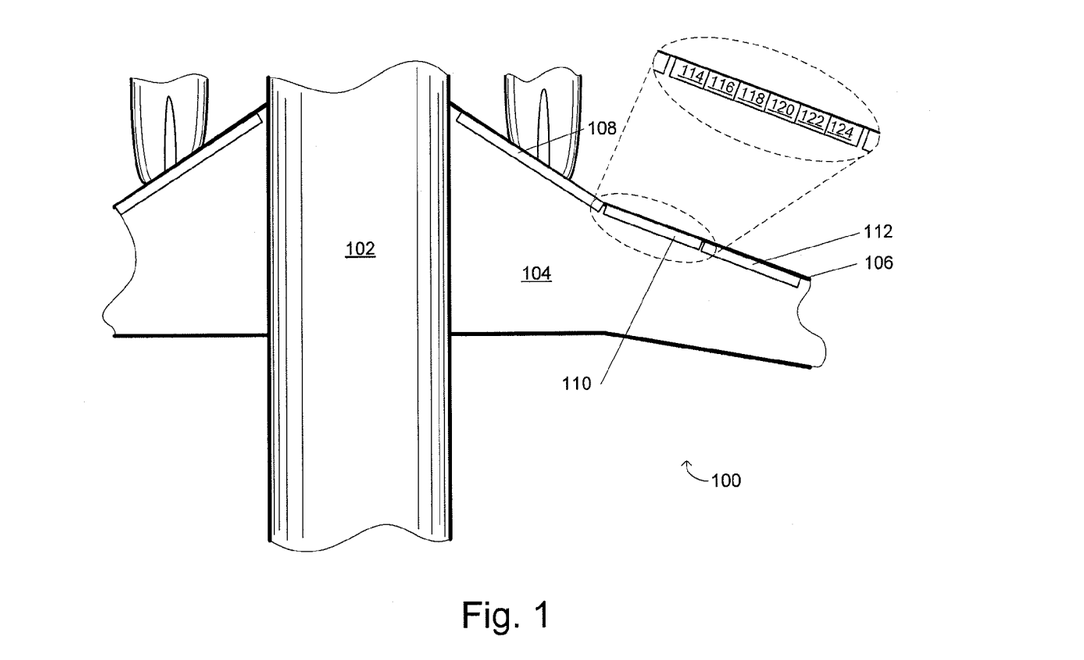
FIG. 1 is an illustration of the placement of heater mats and heater zones of an ice protection system of an aircraft.

FIG. 1 is an illustration of a portion of an aircraft, showing the placement of heater mats and heater zones of an ice protection system of an aircraft. The aircraft 100 includes a fuselage portion 102 and a wing portion 104. On the leading edge 106 of the wing 104 are provided a plurality of heating mats 108, 110, 112 and others (not shown).

Each heater mat is divided into any number of span and or chord wise heater zones. The number and size of the heater zones are chosen to suit a particular safety and performance model, for example such that up to two heater zones can fail without causing a hazardous or catastrophic failure of the aircraft. In one aircraft design, safety requirements require each heater mat 110 to be divided into six separate heater zones 114, 116, 118, 120, 122, 124.

Each heater zone typically includes at least one anti-icing element (not shown) in the vicinity of a stagnation zone where ice accretion is normally most severe and ice caps may form, and a number of de-icing elements (not shown) adjacent to the anti-icing element. In accordance with known de-icing techniques, the ice protection system maintains the anti-icing element at a temperature sufficient to prevent ice forming above the element, and intermittently cycles power to the de-icing elements to shed any ice formed above them by run-back water from the anti-icing zone, for example.

Figure 2:
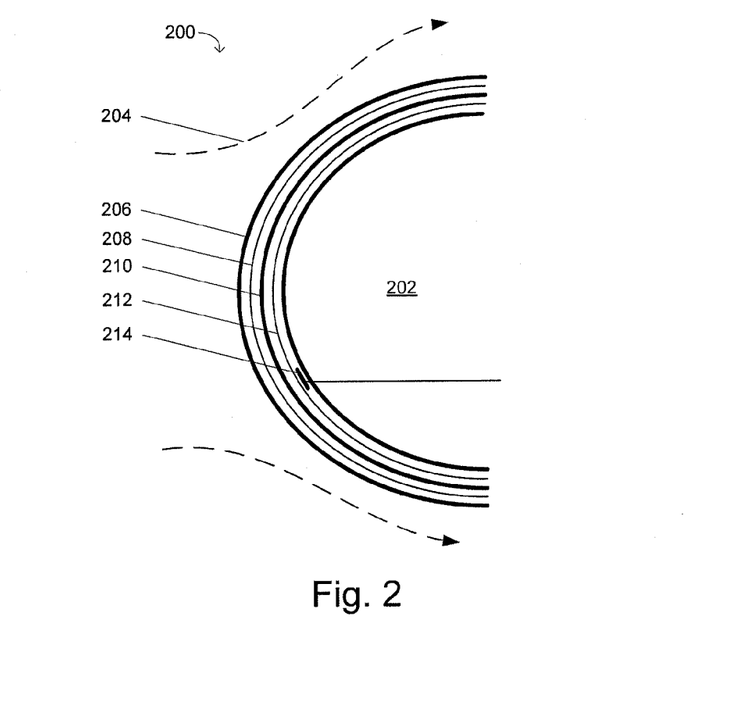
FIG. 2 is a cross-section of the structure of an aircraft wing section.

FIG. 2 is a cross-section 200 of the structure of an aircraft wing section. The figure shows the leading edge 202 of the wing in cross-section and an approximation of the airflow 204 over the wing whilst in flight. The wing includes an erosion shield 206, typically a stiff, erosion-resistant aluminium shield, a dielectric (insulator) 208, a heater mat 210, another dielectric 212, and a temperature probe 214. The layers 206, 208, 210, 212 are much thinner than as shown, forming a thin sandwich at the edge of the wing section. Alternatively, titanium or polyurethane may be used instead of aluminium for the shiled.

The main wing section 202 is formed from any appropriate material, such as composite materials that comprise a plurality of layers of stiff material bound together with glue. Composite materials have a good ratio of strength to weight, but are susceptible to failure by delamination (when the glue melts) at a relatively low temperature. Also, the dielectric can lose its strength over time, which can result in failure. Therefore care needs to be taken to avoid 'overshoot' (overheating) of the heater mat.

It will be appreciated that a similar arrangement may be provided on other exposed parts of the aircraft structure (such as on propeller leading edges or on engine inlets, for example).

Figure 3:
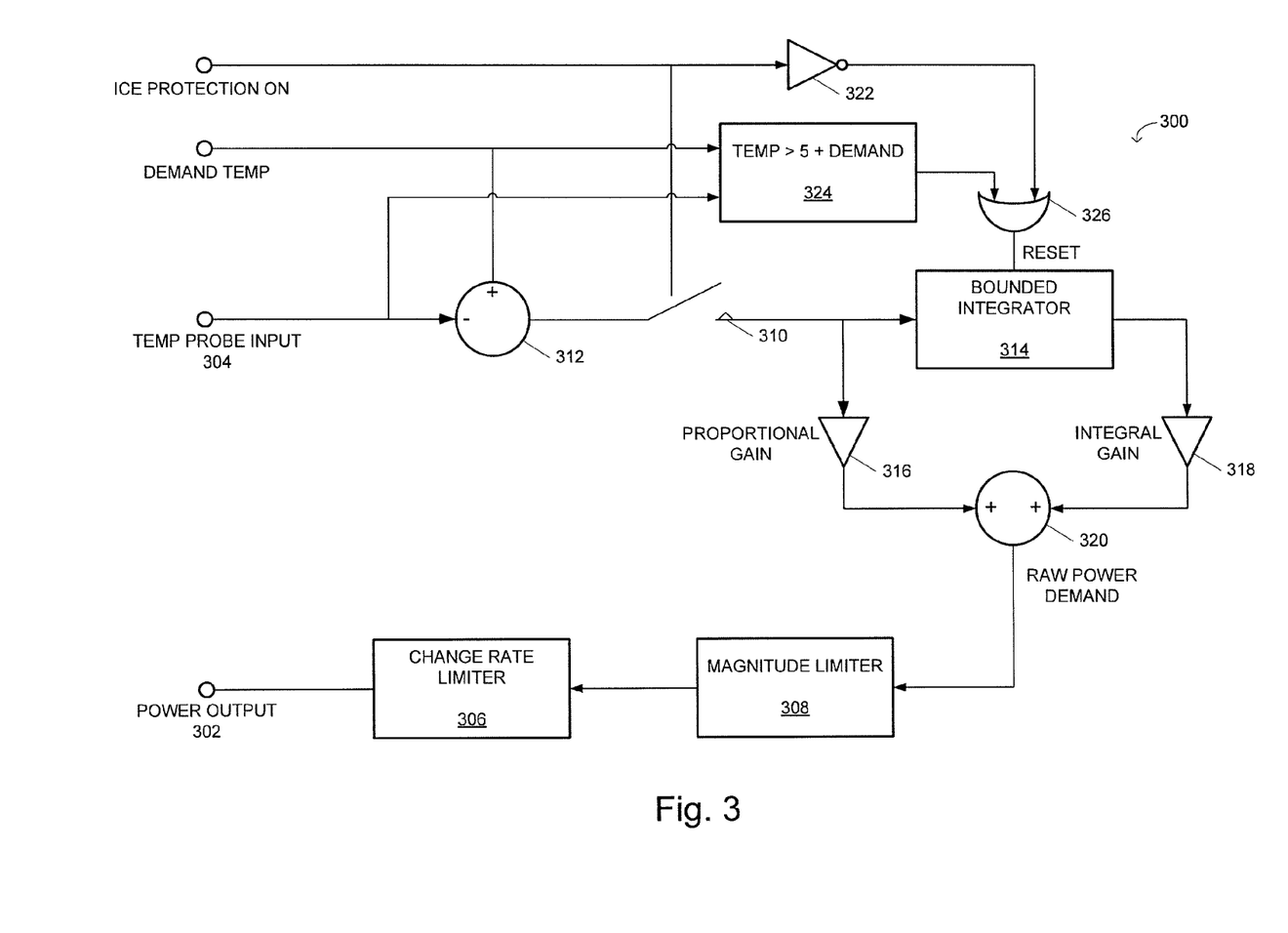
FIG. 3 is a schematic of a temperature control system for use with the ice protection system of FIG. 1.

FIG. 3 is a schematic of a control system for use with the ice protection system of FIG. 1.

The control system 300 provides a heater output to a heater mat 302, and receives an input from the temperature probe 304. A power output 302, ultimately for driving the heater mat (not shown), is provided by a change rate limiter 306 and a magnitude limiter 308 that conditions the power demand in order to avoid placing undue strain on the generator of the aircraft (or other structure, as applicable).

The mat temperature is controlled through control of the power supplied to the mat. The power may either be controlled on the basis of the temperature sensor 304, directly, or through the derived surface temperature. As the derived surface temperature is dependent on power, in addition to the temperature sensor value, it may be less stable in control. For this reason in the present embodiment it is chosen to control power on the basis of the output of the temperature sensor 304 at the rear of the mat.

When the ice protection system is switched on (via the 'ice protection on' input), the switch 310 closes to form the control loop, and the temperature probe input is subtracted from the input demand temperature by the processing unit 312 to determine an error signal. The error signal is then fed into a bounded integrator 314 and a proportional gain unit 318. The output of the bounded integrator is fed through an integral gain 318. The proportional output and the integral output are summed by the processing unit 320, and fed into the power output chain via the magnitude limiter 308.

The ice protection enable signal is inverted by the inverter 322 to produce a first reset signal. The demand temperature and the measured temperature are compared by the processing unit 324 to determine whether or not the measured temperature exceeds the demand temperature by more than five degrees centigrade (or any other threshold that is desired to be set). If so, a second reset signal is generated. The two reset signals are fed into the OR gate 326, which has an output connected to the bounded integrator 314. If either reset signal is activated, the bounded integrator is reset. This can reduce the incidence of overshoot errors.

Disregarding the effect of the change rate limiter 306, the magnitude limiter 308 and the like, the control system implements an approximation of the following proportional/integral (PI) control function:

$$o(t) = ki(t) + k_i \int_0^t i(\tau)\, d\tau$$

where i(t) is the input from the temperature probe at time t, o(t) is the heater output at time t, k is the proportional gain, and $k_i$ is the integral gain.

Appropriate values of the parameters k and $k_i$ are selected in accordance with the principles of control theory in order to provide a control system that is stable and relatively responsive but which does not overshoot significantly.

The control system 300 also includes other components such as analogue to digital converters, digital to analogue converters, power amplifiers, calibration filters, and so on which have been omitted for clarity. In the present embodiment, the control loop processing (in particular the PI controller element) is carried out by a digital signal processor (DSP), with the necessary transducers, power amplifiers and switching circuitry provided in hardware. Alternative arrangements, using any appropriate mixture of analogue and digital systems, are of course possible.

In a variant of the above embodiment a derivative controller may also be provided (optionally in place of the proportional and/or integral elements), which can improve the responsiveness of the system to external disturbances. However it may be preferred to omit the derivative controller in order to minimise sensitivity to noise. In another variant, the proportional and/or integral gains can be implemented using adaptive filters, to allow the system to be tuned to provide optimal responsiveness without significant overshoot.

The overall operation of the system will now be described in more detail.

The ice protection system of a large aircraft can be constructed from over 100 separate heater mats, and it can be cumbersome and expensive to provide a temperature sensor and a control system for each heater mat. The present embodiment addresses this issue by driving multiple heater mats from a single temperature sensor and control system, as will now be described.

Figure 4:
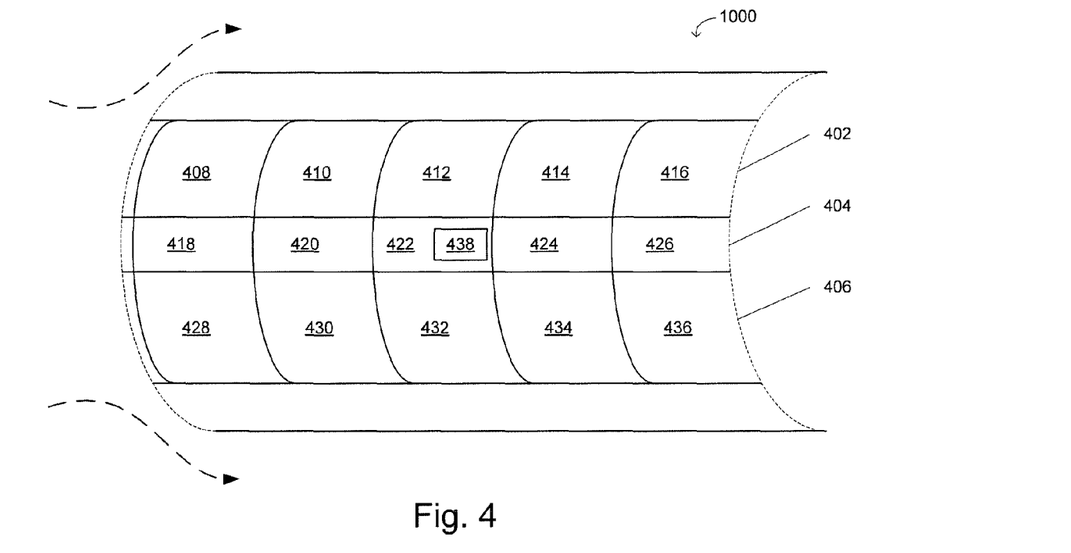
FIG. 4 is a front-on view of the wing section of FIG. 2 showing the placement of individual heater mats and a temperature sensor.

FIG. 4 is a front-on view of the wing section of FIG. 2 showing one possible arrangement of individual heater mats and a temperature sensors.

The wing structure 400 includes a first de-icing strip 402, an anti-icing parting strip 404 arranged approximately around the stagnation zone of the wing, and a second de-icing strip 406. The de-icing strips 402, 406 are arranged so as to prevent the formation of ice caps/bridging, which can prevent the shedding of ice from other de-icing zones, despite bonds in the other de-icing zones being broken. The first de-icing strip 402 comprises individual heater mats 408, 410, 412, 414, 416. The parting strip 404 comprises individual heater mats 418, 420, 422, 424, 426. The second de-icing strip 406 comprises individual heater mats 428, 430, 432, 434, 436. In this example a temperature sensor 438 is provided behind the central parting strip mat 422 although it could be positioned anywhere.

In the present embodiment all of the individual heater mats are driven from the single temperature sensor 438. As noted, this can simplify construction and reduce cost. However, the thermal loading on the wing (and thus on each heater mat) not only varies with icing conditions but also with the position on the wing and the current flying conditions (angle of attack, wind speed, and so on). There are in fact many factors influencing the thermal load which cannot all effectively be measured and accounted for. However, another approach can be taken to address the varying thermal load, as will now be described.

Figure 5:
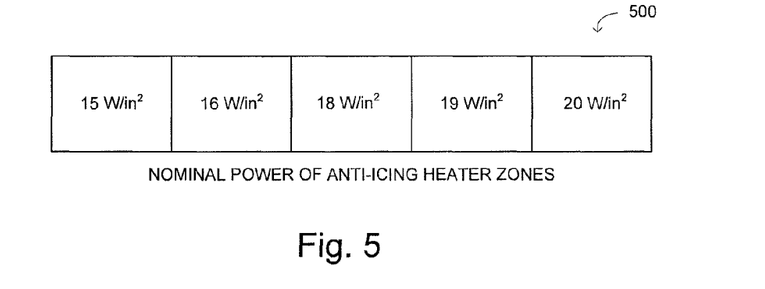
FIG. 5 is an illustration of the nominal power of different anti-icing heater zones.

FIG. 5 is an illustration of the nominal power of different anti-icing heater zones (with reference to the parting strip 404 of FIG. 4).

The parting strip 500 contains five separate heater mats. The nominal power of each of the heater zones that is required for effective anti-icing performance is determined during testing under a typical icing conditions (in a wind tunnel, for example). Some typical values of nominal power are illustrated in the figure.

Figure 6:
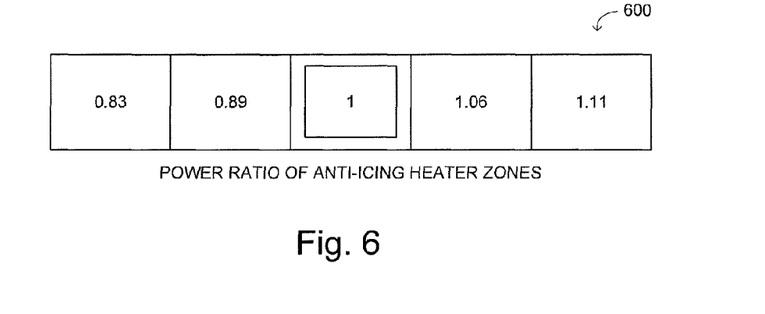
FIG. 6 is an illustration of the ratios of the nominal powers of FIG. 5.

FIG. 6 is an illustration of the ratios of the nominal powers of FIG. 5.

The parting strip 600 is again shown, and the relative power ratios of the anti-icing zones (relative to the central zone in which the temperature sensor is located) are shown.

It was found that the relative power ratio required for effective anti-icing (and also de-icing, as appropriate) did not vary significantly during variations in icing conditions. Correspondingly, it was found that heater zones without temperature sensors could effectively be slaved off the control output for a heater zone with a temperature sensor essentially by multiplying by the power ratio of nominal power consumption.

In other embodiments the power ratio can be defined as a more complicated function, for example varying in dependence on a measured property of the icing conditions, in order to more accurately model the relative power requirements under different conditions.

An example of a control system for the slaved heater zones will now be described.

Figure 7:
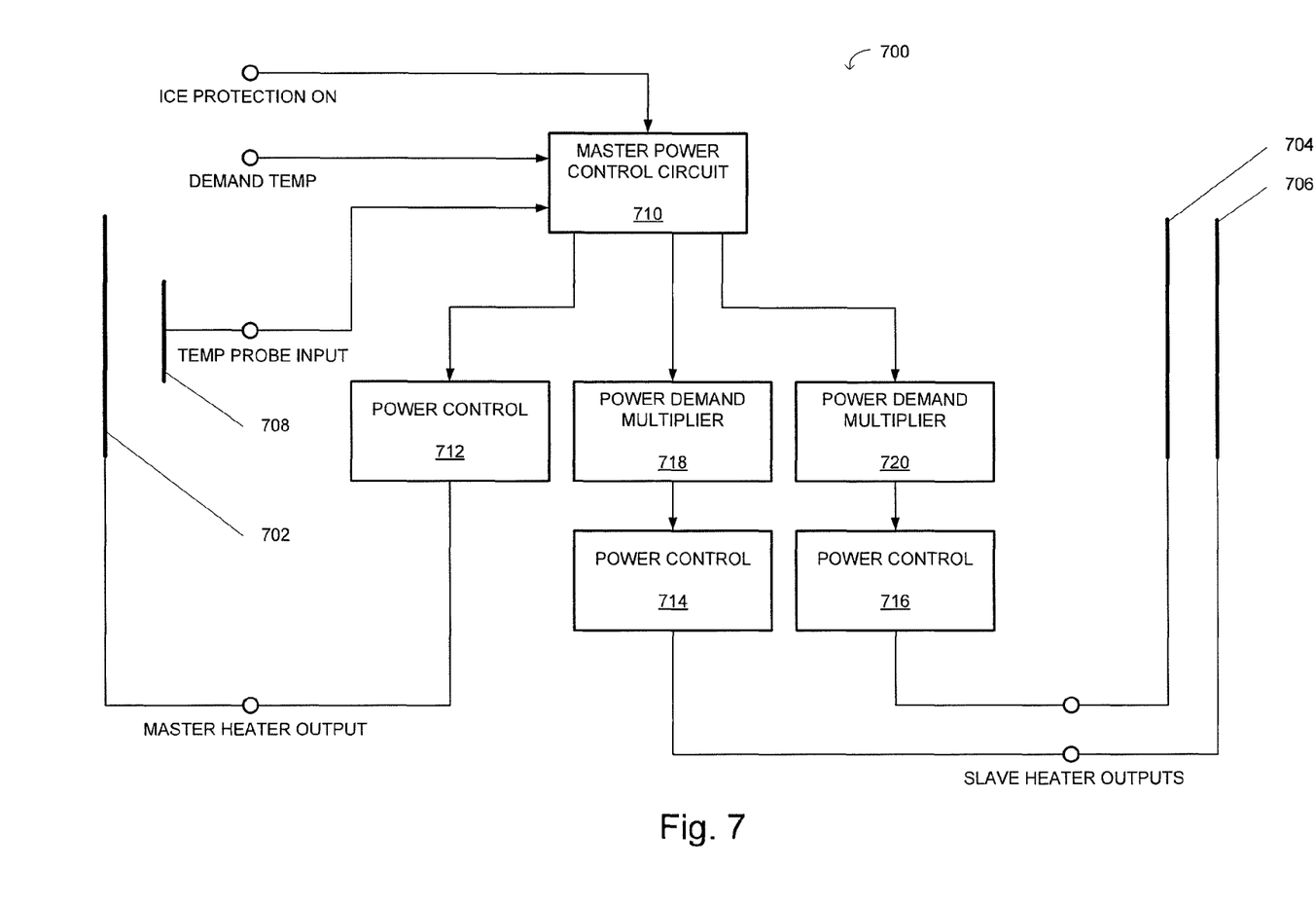
FIG. 7 is a schematic of a temperature control system for use with the heater zones of FIG. 4.

FIG. 7 is a schematic of a temperature control system for use with the heater zones of FIG. 4.

Three heater mats 702, 704, 706 are shown. The first heater mat 702 is of the type shown in FIG. 3 with an associated temperature probe 708. The other heater mats 704, 706 are slave devices as discussed above (such as the heater mats 420, 424 of FIG. 4).

A master power control circuit 710 is provided, of the type shown in FIG. 3. The master control circuit 710 takes the temperature probe 604 input, a demand temperature, and an ice protection enable signal as an input, and generates a power demand using proportional/integral (PI) control as described above. The heater mats are driven using a power control unit 712, 714, 716. The power demand of the slave mats 704, 706 are first filtered and conditioned through power demand multipliers 718, 720, which effectively multiply the power demand by the appropriate power ratio discussed above in relation to FIG. 6. (The power control 1312 and power demand multipliers 1318, 1320 are driven by the power output 302 of FIG. 3.)

The control system can be scaled up as necessary and refinements to the control scheme can be made as discussed above.

Problems can occur with the above-described control scheme due to tolerances in the manufacture of the heater mats and dielectric layers, for example.

Figure 8:
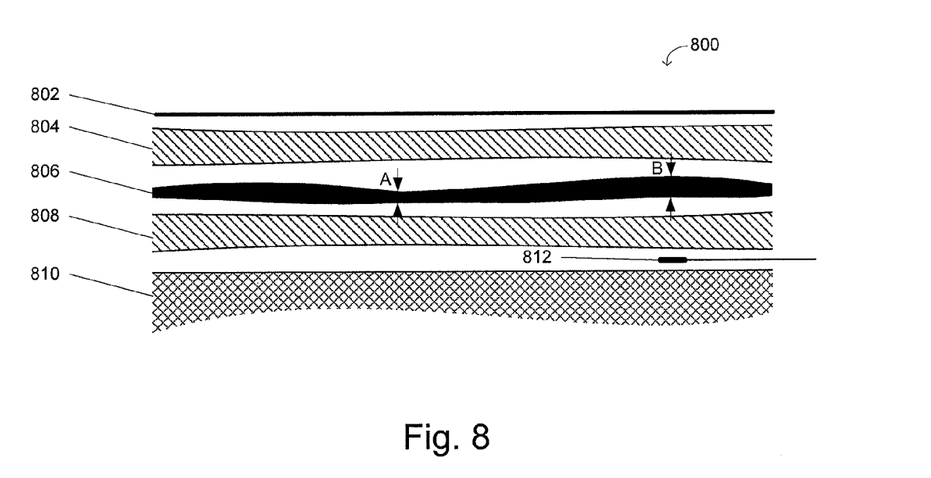
FIG. 8 is an illustration of the aircraft wing section of FIG. 2 in more detail, showing (in exaggerated form) the effect of manufacturing tolerances on the heater mat and dielectric layers.

FIG. 8 is an illustration of the aircraft wing section of FIG. 2 in more detail, showing (in exaggerated form) the effect of manufacturing tolerances on the heater mat and dielectric layers.

The wing section 800 includes as before an erosion shield 802, a first dielectric layer 804, a heater mat 806, a second dielectric layer 808, an inner structure 810 and a temperature probe 812.

It can be seen that the heater mat has different thickness at points A and B, for example. The different in thickness results in a local variation in the resistance of the heater elements. The local heat flux ($Q_{out}$) out of the wing or other component is equal to the local power density (which may be measured in $W/m^2$ or $W/in^2$, for example), which in turn is proportional to the resistance R (because the power dissipated $P=I^2R$, where I is the current in the heater mat, which is essentially uniform because the sub-portions of the heater element are connected in series). Thus the variation in resistance due to the varying thickness in turn causes a variation in the local heat flux $Q_{out}$.

In addition, the thickness of the dielectric layers 804, 808 may vary, affecting the local thermal conductivity K of the layers 804, 808

The outside temperature ($T_{out}$), the heater mat temperature ($T_{heatermat}$) and the heat flux $Q_{out}$ can be related by the following formula:

$$Q_{out}=K(T_{heatermat}-T_{out}) \quad \text{[Equation 1]}$$

where Q is the local heat flux (measured in $W/m^2$ or $W/in^2$, for example) and K is the local thermal conductivity (measured in $W/m^{2\circ}$ C. or $W/in^{2\circ}$ C., for example).

Thus it can be appreciated that a variation in the local heat flux Q or the local thermal conductivity K, arising from a variation in thickness of the heater mat 806 or the dielectric layer 804 respectively, can cause a variation in the outside temperature $T_{out}$ for a given heater mat temperature $T_{heatermat}$, and vice versa.

In use, the erosion shield 302 can effectively equalise the outside temperature $T_{out}$ (due to the high thermal conductivity of the shield if made of metal), although the control system will work with polyurethane based erosion shields (low thermal conductivity). Applying equation 1, we can see that the local heater mat temperature thus varies in proportion to the variations of the local thermal conductivity K and local heat flux Q (which are caused by variations in the thickness of the heater mat and dielectric layers, as noted above).

In FIG. 8, it can be observed that the temperature probe 812 is located adjacent to the thickest part of the heater mat (for example). The significance of this will be discussed shortly.

Figure 9:
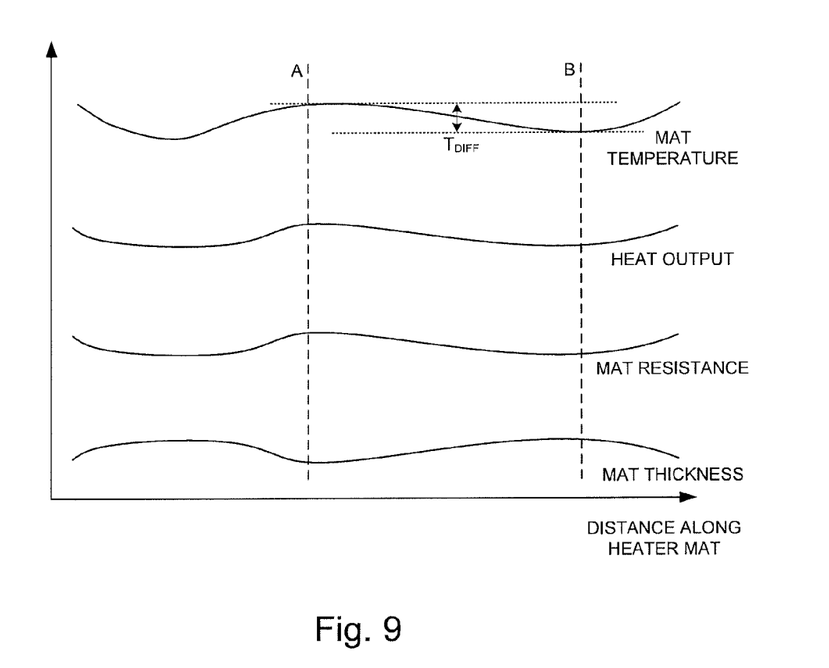
FIG. 9 is a graph illustrating the effect of the variation of the thickness of the heater mat of FIG. 8.

FIG. 9 is a graph illustrating the effect of the variation of the thickness of the heater mat of FIG. 8.

Following on from the discussion regarding Equation 1 above, the graph in FIG. 9 illustrates the approximate variation of heater mat thickness, heater mat resistance, heat output ($Q_{out}$) and resulting heater mat temperature along the length of a cross section through the wing structure, disregarding any variation in thickness of the dielectric layers (partly for simplicity and partly because the heater mat variation is a more significant factor). It can be observed that as the thickness decreases, the mat resistance increases and as a consequence the local heat output ($Q_{out}$) also increases. As the heat output increases, so does the local mat temperature ($T_{heatermat}$), and vice versa.

The total expected variation in temperature along the length of the heater mat $T_{diff}$ is indicated in FIG. 9. With reference to the placement of the temperature probe shown in FIG. 8 at the position B (the thickest part of the heater mat), it can be seen that the temperature of the thinnest part of the heater mat (position A) is $T_{diff}$ higher than the temperature at position B.

It will be recalled that the temperature probe reading is used to control the power applied to the heater mat. In particular, the control system varies the applied power to keep the temperature measured by the temperature probe to a constant setpoint temperature ($T_{setpoint}$). The setpoint temperature is chosen to keep the temperature of the heater mat below a critical temperature at which adjacent parts of the wing (or other) structure delaminate and fail (at approximately 140° C. in the present embodiment), but high enough that the temperature at the erosion shield is maintained above a criticial temperature (approximately 20° C. in the present embodiment) sufficient to melt ice accreted on the shield, even in a worst-case icing scenario. The preferred (average) heater mat temperature may typically be in the region of 130° C.

Thus in this case the control loop will cause the heater mat temperature at position B to approximate $T_{setpoint}$ (typically in the region of 130° C.). Consequently the temperature at position A will approximate $T_{setpoint}+T_{diff}$. If $T_{diff}$ is high enough (above 10° C., say, in the present embodiment), then delamination may occur (above 140° C.) and catastrophic failure of the aircraft may follow. This condition is known as 'overtemperature'.

If the temperature probe were instead located at position A, the average heater mat temperature would be below $T_{setpoint}$ and the amount of heat emitted by the heater mat may be insufficient to cause melting of ice in a worst case scenario state, causing uninhibited ice accretion and again a possible catastrophic failure of the aircraft. This condition is known as 'undertemperature'.

It will also be appreciated that 'slaved' heater mats (that is mats not having their own temperature sensor and dedicated control circuitry) may have further variations in thickness and thermal performance, such that any control errors effectively 'stack up'. The maximum size of $T_{diff}$ that is possible before failure may occur may therefore be reduced.

The heater mat control system will now be described in more detail, with particular reference to the constraints on heater mat temperature and erosion shield temperature across a variety of icing conditions.

Figure 10:
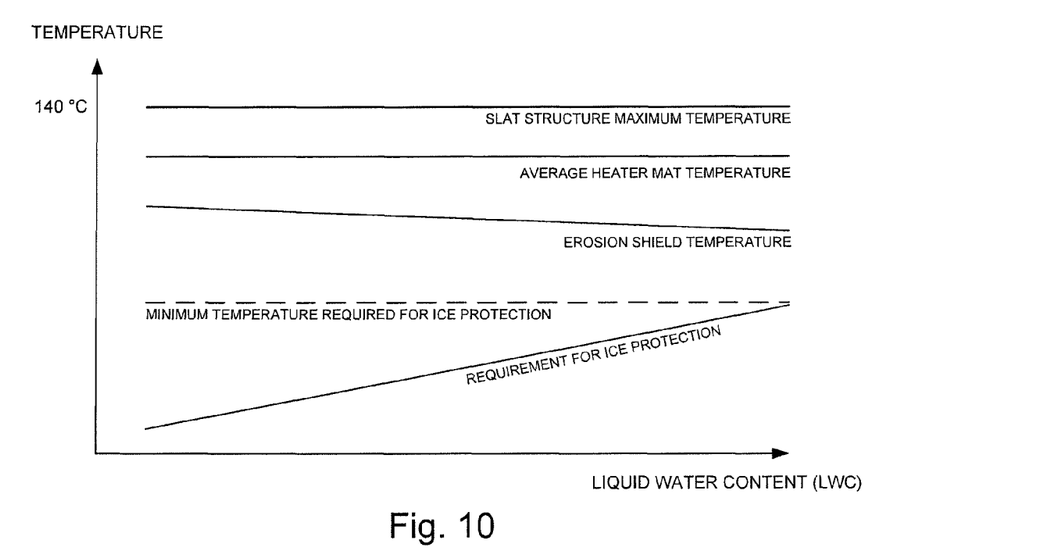
FIG. 10 is a graph illustrating the dependence of various temperature measurements on liquid water content (LWC)

FIG. 10 is a graph illustrating the dependence of various temperature measurements on liquid water content (LWC).

The LWC is one measure of the icing conditions that determines how much ice forms and therefore how much power is required to be supplied to remove the ice. The slat structure maximum temperature (approximately 140° C.) is shown on the graph, indicating the point beyond which delamination (structural failure) may be expected to occur. At the bottom of the graph the requirement for ice protection is shown, indicating the erosion shield temperature that is required in order to avoid the formation of ice. As the LWC increases, a higher temperature is required in order to prevent ice formation.

A minimum temperature for ice protection is indicated on the graph, corresponding to the temperature of the erosion shield that is necessary to prevent the formation of ice under the most extreme icing conditions (the highest LWC).

In the present embodiment, the control system described above ensures that the average heater mat temperature is approximately constant, regardless of the icing conditions. The average heater mat temperature is chosen so that there is a suitably large margin of safety between the average heater mat temperature and the slat structure maximum temperature, but also so that the erosion shield temperature (also indicated on the graph) exceeds the minimum temperature required for ice protection by another appropriate safety margin. It can be seen (and is to be expected) that for a constant heater mat temperature, the erosion shield temperature drops with increasing LWC (because of the increasing thermal load on the system).

It will be appreciated that the control system described above can supply more energy to the heater mats than may be required for a particular set of icing conditions, but it will also be appreciated that the control system is relatively simple and relatively stable, since it does not depend on any temperature measured at the erosion shield or otherwise distant from the heater mat (which can lead to instability because of the lag caused by thermal capacity between the heater mat and the temperature sensor). Additionally, the control system described above can lead to a relatively constant power demand from the ice protection system, which is in many cases preferable to a rapidly varying and relatively unpredictable power demand.

Figure 11:
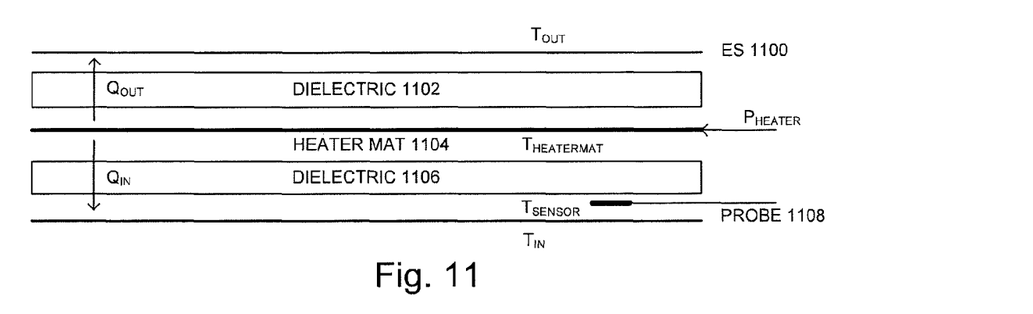
FIG. 11 is a further illustration of the wing section of FIG. 2, showing the heat flows within the structure.

FIG. 11 is a further illustration of the wing section of FIG. 2, showing the heat flows within the structure.

The erosion shield 1100, first dielectric layer 1102, heater mat 1104, second dielectric layer 1106 and temperature probe 1108 are shown schematically. It can be observed that an input heater mat power $P_{heater}$ is transformed into a heat flux Q (measured in W/in$^2$ or W/m$^2$ for example) that is divided into a heat flux $Q_{out}$ towards the outer surface of the wing, and a heat flux $Q_{in}$ towards the internal portion of the wing.

The input power $P_{heater}$ can be related to the heat fluxes $Q_{out}$ and $Q_{in}$ by the following equation:

$$Q = Q_{out} + Q_{in} = P_{heater}/A$$

where A is the area of heat transfer.

In practice, the heat flux $Q_{in}$ is vastly smaller compared to the heat flux $Q_{out}$ ($Q_{out} \gg Q_{in}$), so we can say $$Q \approx Q_{out} \approx P_{heater}/A \quad \text{[Equation 2]}$$

By wind tunnel testing (or otherwise) the maximum $Q_{out}$ required to allow anti-icing function under worst case scenario icing conditions can be determined. Using Equation 2, this value can be related to a required power dissipation $P_{heater}$ in the heater mat.

The power $P_{heater}$ can in turn be related to the voltage and current applied to the heater mat by the following equation:

$$P_{heater} = I_{heater} \times V_{heater} \quad \text{[Equation 3]}$$

Bearing this in mind, the present embodiment employs a calibration system in order to compensate at least partially for the effect of varying heater mat thickness (and heater mat temperature variations).

Figure 12:
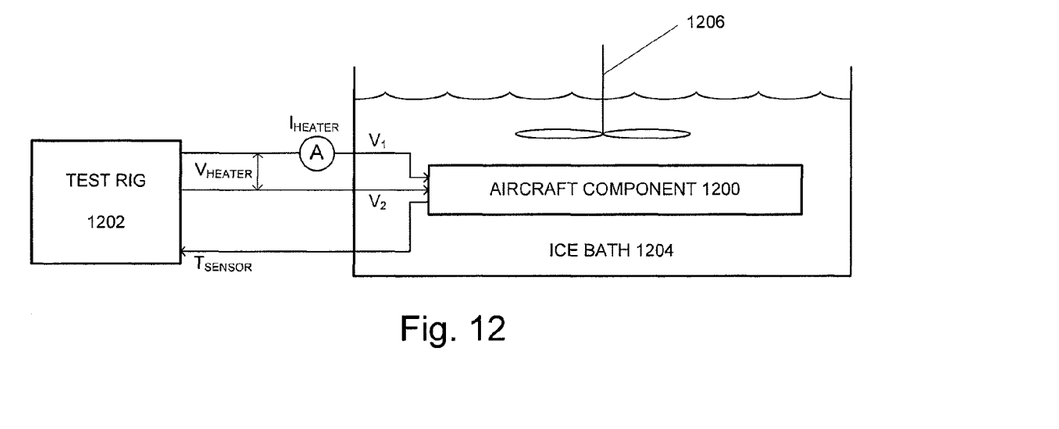
FIG. 12 is a schematic of a calibration system to determine a temperature setpoint for the control system of FIG. 3.

FIG. 12 is a schematic of a calibration system to determine a temperature setpoint for the control system of FIG. 3.

The system includes an aircraft component 1200, such as a wing section, having the ice protection heater mats (or a portion thereof) installed on it. The aircraft component 1200 is connected to a test rig 1202, which may be a computer workstation and associated electrical equipment, for example, and is immersed in an ice bath 1204, which includes enough mass of ice and water to maintain an essentially constant temperature of 0° C. A stirrer 1206 helps to maintain an even, constant temperature. In variants the heater mats may be replaced by other appropriate electrothermal or other heater systems.

During the calibration process, a known amount of electric power $P_{heater}$ is applied to the heater mat. As noted above, the applied power can be determined by measuring the applied voltage and the resulting current, and controlling the two parameters appropriately until the desired power level is reached, for example.

A power $P_{heater}$ is chosen such that the total heat flux $Q_{out}$ into the ice bath is equal to the maximum heat flux under worst-case icing conditions (see Equation 2 above). The heat flux $Q_{out}$ causes a temperature drop between the heater mat and the external surface of the wing (or other component).

The temperature sensor reading $T_{sensor}$ is read by the test rig. We know the external temperature $T_{out}$ (in this case 0° C.), and from this we can calculate the temperature drop between the temperature sensor and the external surface as follows:

$$T_{drop} = T_{sensor} - T_{out} \quad \text{[Equation 4]}$$

The knowledge of the temperature drop $T_{drop}$ can then be used to calculate the setpoint temperature for the heater mat control for a given target external temperature $T_{target}$:

$$T_{setpoint} = T_{sensor} + (T_{target} - T_{out})$$

Because $T_{out} = 0$ (° C.) this can be simplified to $$T_{setpoint} = T_{sensor} + T_{target} \quad \text{[Equation 5]}$$

In the example of the present embodiment where the desired external temperature Tout is desired to be in the region of 20° C., the setpoint temperature can thus be computed as follows:

$$T_{setpoint} + T_{sensor} + 20$$

Where (to recap) $T_{sensor}$ is the temperature reading obtained during the ice bath test, and $T_{setpoint}$ is the setpoint temperature (the 'demand temp') used in the control circuit shown in FIG. 3.

It will be appreciated that this setpoint temperature $T_{setpoint}$ may differ from the expected average heater mat temperature $T_{heater}$ by an amount necessary to correct for any variation in local heater mat thickness in the vicinity of the temperature probe. Thus the margin of error in the heater mat temperature can be more effectively constrained, and additional heater mats can be slaved from the heater mat with the temperature probe with a greater degree of safety.

In the present embodiment a uniform design of controller may be used which has a uniform setpoint temperature $T_{Tsetpoint0}$ programmed into it. Different portions of the ice protection system may each have dedicated controllers. In one configuration one controller may be used per phase per portion, and a number of portions of heater mats may be provided. Each controller may have a respective, independent setpoint temperature $T_{setpoint1}$, $T_{setpoint2}$, $T_{setpoint3}$ . . . $T_{setpointN}$ associated with it that may have been determined using calibration of the type mentioned above, for example.

Rather than modifying each controller, which may pose difficulties since the controller may typically be manufactured and tested independently of the heater mat components, an appropriate correction may be made by varying the electrical properties of the heater mats and/or temperature probes. In particular, a correction can be made by inserting a resistor network of appropriate resistance values in series and parallel configurations with either the heater mat, the temperature probe, or both. Of course, other appropriate techniques may be used depending on the type of temperature probe, for example an embedded circuit or thermocouple. By use of such a correction each controller, operating with a nominal setpoint temperature $T_{setpoint0}$, can be made to effect the variety of setpoints $T_{setpoint1}$, $T_{setpoint2}$ and so on.

It will be appreciated that the calibration method described above does not rely on establishing the average heater mat temperature, which is relatively difficult to do, but instead calibrates the heater mat system as a whole.

It has been mentioned above that an ice bath may be used to immerse a structure being calibrated. It will be appreciated that other configurations using other fluids (liquids or gases) may be used. Generally it is desirable that the fluid acts as a heat reservoir (or heat sink) with a relatively high thermal capacity, such that it can absorb relatively large quantities of heat from the structure under test without the temperature of the fluid increasing. Additionally or alternatively, there may also be provided a heat pump or similar mechanism to reject heat from the test environment as it is generated by the heater device(s).

It will also be appreciated that the embodiment described above may be applied more generally and where appropriate to other types of heater system other than ice protection systems. Such other heater systems may include, for example, various forms of immersion heater, hot plates and the like, and so on.

A surface-mounted design of heater mat has been described above, for application to composite material structures. It will be appreciated that the heater mats and associated temperature probes can also be embedded into the wing (or other) structure, or attached to the interior of a (hollow) wing structure. Normally external or embedded heater mats may be more suitable for composite material wing structures. The design can also be applied to metal structures, in which case external or interior heater mats may be more suitable. The design can of course be implemented for other structural materials and designs.

An ice protection system has been described above with particular reference to preventing ice build-up on the aerodynamic surfaces of an aircraft. However, it will be appreciated that the ice protection can find application in many other fields, including both mobile structures (including vehicles of various kinds) and static structures. For example, the ice protection system could be use on land- or water-based vehicles (such as cars, buses, boats, ships and various military vehicles) as well as other air-based vehicles such as helicopters, spacecraft and the like. The system can also be used on buildings, bridges and other miscellaneous constructions including antennae and power transmission cabling, which may be particularly sensitive to a build-up of ice. In such applications, ice formation may occur due to prevailing environmental conditions (cold climate and/or high winds) and/or because of the movement of a vehicle (creating high effective wind chill, for example).

It will be appreciated that the ice protection system described above can also (where applicable) be adapted for use in any environment or application in which a surface or other part of a structure or the environment is required to be kept above a particular temperature (including situations in which no ice is present, for example to avoid condensation rather than ice formation). The system is suitable in particular in situations where a range of conditions prevail that cause a variable amount of heat loss in the structure or environment.

Further modifications lying within the spirit and scope of the present invention will be apparent to a skilled person in the art.

What is claimed is:

1. A system for calibrating a heater system for heating a surface of a structure, the system comprising:
   the structure;
   the heater system, including:
      a heater element;
      a temperature sensor proximate the heater element for outputting a signal indicative of the temperature of the heater element; and
      a controller for controlling the supply of power to the heater element in dependence on the signal to maintain the temperature of the heater element at a first substantially constant temperature;
   a reservoir for immersing the structure in a fluid for maintaining the surface of the structure at a second substantially constant temperature;
   a power supply for supplying an amount of power to the heater element; and
   a sensor for receiving the signal from the temperature sensor and determining a temperature at the temperature sensor, wherein the system is configured to calibrate the heater system by determining a setpoint temperature for controlling the heater element in dependence on the signal and the second substantially constant temperature.

2. A system according to claim 1, wherein the heater system is an ice protection system.

3. A system according to claim 2, wherein the ice protection system is an aircraft ice protection system.

4. A system according to claim 1, wherein the controller has a defined setpoint temperature different to the determined setpoint temperature.

5. A system according to claim 4, further comprising a resistor in series or parallel with at least one of the heater element and the electrical properties of at least one of the respective heater element and the temperature sensor to cause the determined setpoint temperature to become substantially equal to the defined setpoint temperature.

6. A system according to claim 1, wherein the structure is immersed in a thermal reservoir.

7. A system according to claim 6, wherein the thermal reservoir is an ice bath.

* * * * *